United States Patent

Horton

[15] 3,680,349

[45] Aug. 1, 1972

[54] APPARATUS FOR MAKING A CONDUIT FITTING

[72] Inventor: Richard W. Horton, Newark, Ohio

[73] Assignee: United McGill Corporation, Columbus, Ohio

[22] Filed: June 18, 1970

[21] Appl. No.: 57,899

Related U.S. Application Data

[62] Division of Ser. No. 736,351, June 12, 1968, Pat. No. 3,587,163.

[52] U.S. Cl. ................................72/316, 29/157 T
[51] Int. Cl. ............................................B21d 39/00
[58] Field of Search........72/316, 317, 383, 343, 387, 72/411; 29/157 T, 475, 482, 479, 478

[56] References Cited

UNITED STATES PATENTS

| | | | |
|---|---|---|---|
| 2,511,836 | 6/1950 | Cullen | 29/157 T |
| 2,507,859 | 5/1950 | Keller | 29/157 T |
| 2,787,050 | 4/1957 | Markl | 29/157 T |

*Primary Examiner*—Richard J. Herbst
*Attorney*—Strauch, Nolan, Neale, Nies & Kurz

[57] ABSTRACT

A thin walled sheet metal conduit tap fitting and a machine and method for forming the same. A tubular barrel workpiece with a wall opening is supported on a saddle-like guide member tool having a bore base passage registering with but larger than the workpiece opening. A die member is pulled downwardly through the workpiece opening into the base to force and stretch the metal surrounding the opening outwardly as permitted by the larger diameter base to form a tap flange on the barrel. The die member and the tool member base passage are dimensionally related so that the metal is initially guidingly stretched by cooperation with the guide member walls and then is freely stretched in space to form a large faired flange to which a branch conduit is readily connected. A plurality of guide members and die members enable the manufacturing of various fittings from a few standardized barrels and cylindrical taps.

9 Claims, 19 Drawing Figures

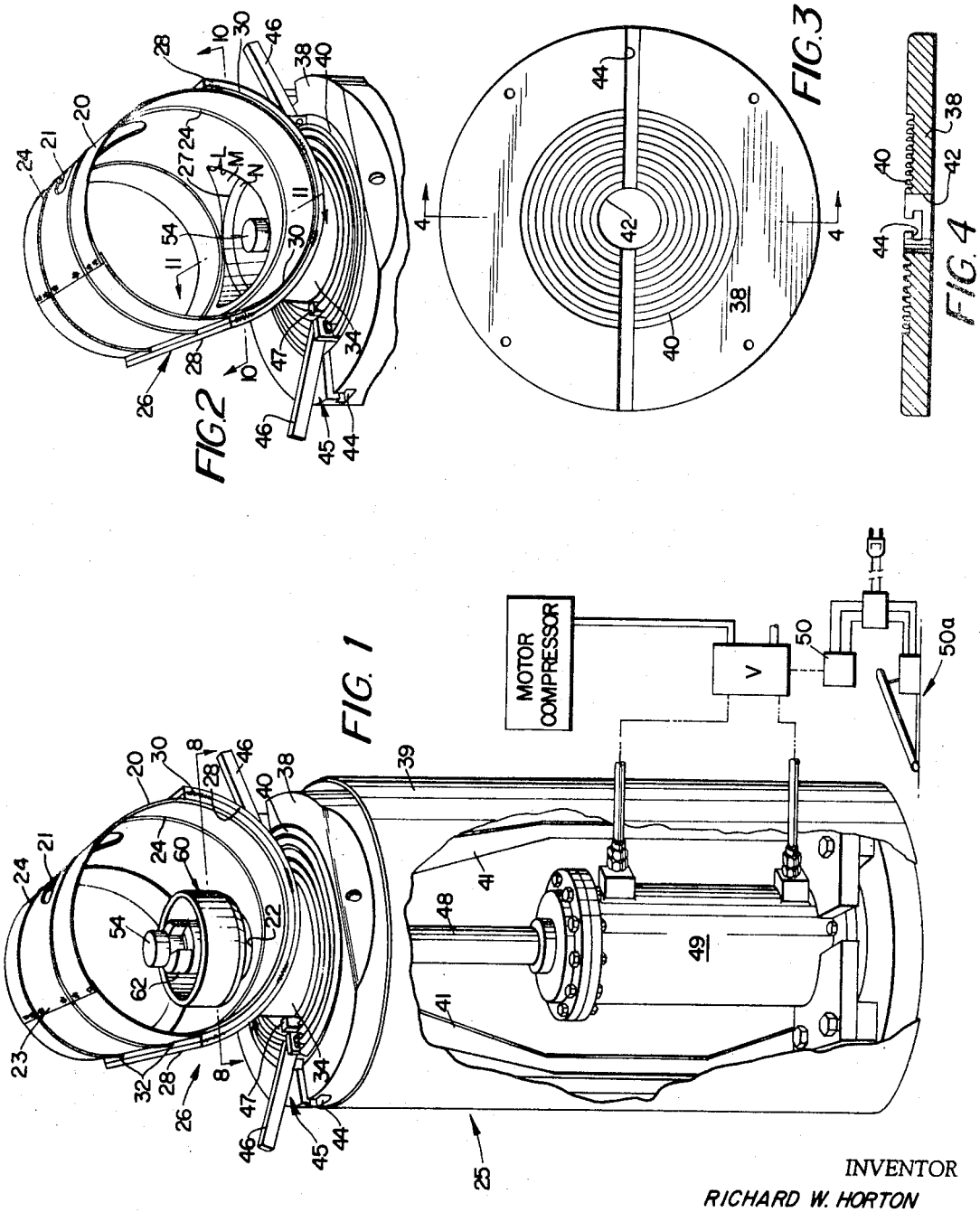

PATENTED AUG 1 1972 3,680,349

INVENTOR
RICHARD W. HORTON

BY Strauch, Nolan, Neale, Nies & Kurz
ATTORNEYS

INVENTOR
RICHARD W. HORTON

INVENTOR
RICHARD W. HORTON

BY *Strauch, Nolan, Neale, Nies & Kurz*
ATTORNEYS

APPARATUS FOR MAKING A CONDUIT FITTING

RELATED APPLICATION

This application is a division of my copending application Ser. No. 736,351 filed on June 12, 1968, now U.S. Pat. No. 3,587,163, for Method And Apparatus For Making a Conduit Fitting and the Article.

BACKGROUND OF THE INVENTION

This invention relates to apparatus and method for making thin walled sheet metal conduit tap fittings and to the fitting per se. More particularly the invention is concerned with a novel method and apparatus which produce a fitting in which a cylindrical tubular branch tap is readily connected to a cylindrical tap flange formed on a main tubular conduit, the integral tap flange having a substantial amount of fairing from the barrel body to its terminal edge to reduce pressure drop and fluid turbulence and enhance laminar flow through the fitting.

Certain disadvantages and inadequacies are present in other methods and devices which have been previously used for forming conduit fittings.

U.S. Pat. Nos. 2,511,836; 2,507,859 and 2,787,050 represent some prior art techniques for making tap fittings which do not have the advantages of the present invention.

One prior art disclosure teaches a method in which a main metallic tubular conduit with a side opening is first supported on a base with the opening facing upwardly. A female die member is then located in a position to surround the opening and hold the conduit in place while an undersize and a final size male die member are sequentially pulled upwardly through the opening to form a cylindrical flange on the conduit which conforms exactly to the shape of the female die. A tubular branch conduit or tap which includes an accurately formed end saddle is placed over and connected to the flange, the end saddle exactly conforming to and fitting the contour of the main conduit. Several disadvantages and complexities associated with this method and apparatus are that special and rather bulky, space consuming equipment must be provided to hold the main conduit and female die in place against the upward pull of the male dies and their actuating mechanism; the cylindrical flange is formed by a two-step drawing operation which increases that cost as well as manufacturing time and reduce production, all of which increases costs; when the tap flange is formed to the final desired dimensions, it is confined to conform to the female die and the inner surface of the flange presents an abrupt direction change with resultant undesirable fluid flow problems; and the requisite need for an accurate exact fitting arcuate saddle connection between the main and branch conduits is a high cost item. Because of the shape of the saddle and the requirement for an exact fit, it is virtually impossible that the joining operation can be satisfactorily performed automatically as by automated welding, preventing labor and material cost saving techniques.

SUMMARY OF THE INVENTION

A primary object of this invention resides in the provision of a novel method and machine for manufacturing a unique, thin walled conduit fitting in which a branch conduit is connected to a main conduit by a tap flange defining a large faired side opening in the main conduit.

Another object resides in the provision of a novel machine of rather simple operation capable of producing conduit fittings at a rapid rate. The machine accomplishes the rapid operation by simply supporting a main tubular conduit workpiece on a part cylindrical guide tool without completely confining it and the forming tool. As a result the tool is pulled completely away from engagement with the workpiece upon completion of the forming operation enabling convenient removal of the article from the machine.

Still another object resides in providing a novel machine capable of forming conduit tap fittings of T and lateral types and of various sizes. The machine includes readily and easily interchangeable parts differing in size to permit operation on and production of the various sized conduits and fittings, from a small number of standardized workpiece components.

A further object resides in the provision of a novel machine for producing conduit tap fittings having a large faired cylindrical tap flange on a main tubular barrel to which a cylindrical branch tap with its connecting end disposed in a plane is connected. The machine includes a saddle shaped guide which supports the main barrel component for a tap fitting while a male die member is pulled through a wall opening in the barrel to form the tap flange. The saddle guide provides primary support for the barrel body and is dimensionally related to the male die so as not to effectively engage or confine the conduit material surrounding the barrel opening and forming the flange throughout the die-pulling operation.

A still further object resides in the provision of a novel method of manufacturing thin walled conduit fittings comprising the steps of providing a wall opening in a main tubular conduit, forming an integral cylindrical tap flange by initially guidingly stretching the conduit material adjacent the opening, and then freely stretching the material in space to provide a large faired inner surface curving from the body of the barrel to the cylindrical terminus of tap flange. The method can further include the subsequent step of connecting a flat ended, cylindrical branch tap, with its end edge lying in a plane, to the cylindrical terminus of the tap flange and then providing a complete bond at the connection by using automatic equipment, such as an automatic welder.

Another object resides in the provision of a novel thin walled conduit tap fitting of T or lateral type which includes a main tubular conduit or barrel having a wall opening defined by a large faired cylindrical tap flange to which a cylindrical branch tap conduit, with it connecting end edge lying in plane, is connected.

Still other objects and advantages of the invention will become apparent from the following detailed description and the appended claims.

BRIEF DESCRIPTION OF THE DRAWINGS

FIG. 1 is a perspective, partially fragmented view of the apparatus of the invention illustrating the arrangement of machine components and a tap fitting barrel just before the flange in the barrel of the fitting is formed;

FIG. 2 is a view similar to FIG. 1 illustrating the machine after the die has been pulled through the barrel side wall and the flange has been formed;

FIG. 3 is a top plan view of the machine support table illustrating the circular guide recesses enabling production of various size fittings on one machine;

FIG. 4 is a cross-section view taken along line 4—4 of FIG. 3.

DESCRIPTION OF THE PREFERRED EMBODIMENTS

Figure 13:
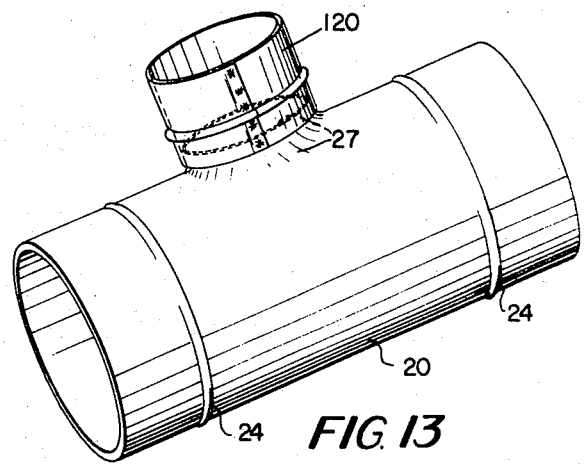
Figure 14:
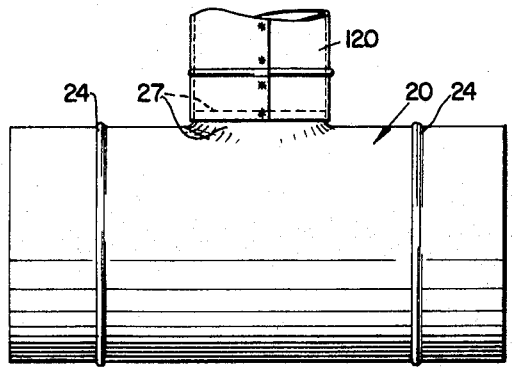
FIG. 14 is a side elevation view of the fitting of FIG. 13 to illustrate the end edge of the branch tap conduit as lying in a plane where it is connected to the faired cylindrical flange.

The conduit fitting made by the method and machine of the present invention is shown in FIGS. 13 and 14 whereas the flange forming machine illustrating one of the stages of the method of making the fitting is best shown in FIG. 1. The description will proceed with reference first to FIG. 1, which shows part of the fitting being made in place on the stretch forming machine. The fitting component is a main cylindrical thin walled metal conduit 20, normally referred to as the fitting barrel which is provided with an opening 22 in its wall. The barrel is in position on a stretch machine 25 used to form the tap flange 27 (FIG. 2). The second wall opening is for a second tap as will be hereinafter described.

Figure 7:
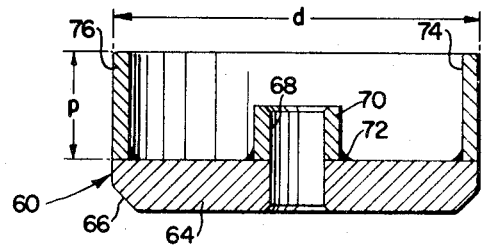
FIG. 7 is a vertical cross-section of one embodiment of the male die.

Conduit barrel 20 is formed from rolling a rectangular thin walled metal sheet and welding the overlapped longitudinal edges at 23. The wall opening 22 is preformed by cutting or punching a hole, preferably of an oval or elliptical shape (see FIG. 7) in the rectangular sheet prior to its being rolled and secured as the conduit barrel 20. Circumferentially extending external rolled ribs 24 provide an offset to cooperate in a conventional manner as an abutment for the end of a line conduit (not shown) to permit ready slip over attachment and proper alignment of the line and the fitting.

Figure 11:
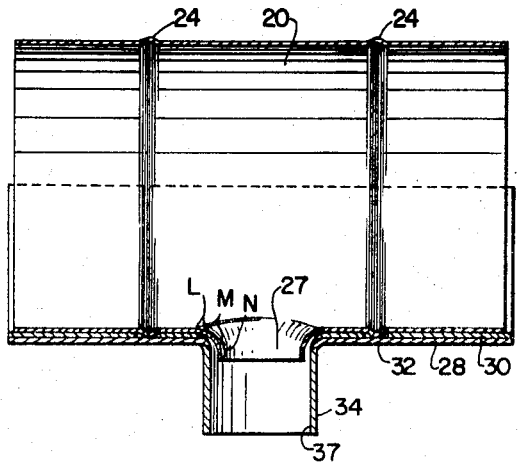
FIG. 11 is a vertical section view taken along line 11—11 of FIG. 2, illustrating the resultant barrel flange at a right angle position relative to that shown in FIG. 10.

The flange forming stretch machine 25 has a support guide 26 with an upper, longitudinally extending, partly cylindrical seat or saddle portion 28 upon which the pre-formed barrel 20 is seated. Shown also in FIGS. 9 and 11, seat 28 includes a three piece liner 30, the spaces between which provide spaced continuous curved recesses 32 in which the ribs 24 of a proper diameter barrel 20 will be disposed to help locate the barrel when it is initially placed in the tool seat 28. Appropriate alignment marks on the barrel oriented with the wall opening and alignment points on the saddle seat can be used to angularly align the barrel wall opening with the saddle base. Saddle guide 26 includes a circular, hollow base portion 34 secured by welding its upper end to seat 28. The upper end of base 34 is contoured to conform to the cylindrical shape of the seat 28 which has a central, large faired opening 36 aligned with the cylindrical passage 37 through the base 34 and defines therewith a vertical passage through the saddle guide 26 with which the barrel wall opening 22 is aligned when the barrel is properly seated. The diameter of base passage 37 is designated at $b$.

Guide 26 rests on a sturdy anvil like table 38 suitably mounted on support structure 41 enclosed in a casing 39. Table 38, FIGS. 3 and 4, is made from metal which can be cast iron or steel, and has a plurality of circular grooves 40, a central opening 42, and a diametrically extending inverted T-slot 44. The inner wall of each groove has a diameter corresponding to standardized I.D.'s of round sheet metal conduit for utilizing the method corresponding to FIG. 12, otherwise the diameters of the grooves need not correlate with the standardized duct diameters. The circular lower end of base 34 of saddle guide 26 seats in a table groove 40 which has an internal diameter approximately equal to the base passage diameter $b$. Retaining clamps 45 have flanged shoes which ride in the T-slots 44 and, via an extended handle pivot pin which cooperates with adjacent ones of the circular grooves 40, enables a cammed wedging abutment between the clamp handle 46 and an abutment pad 47 to hold the pad 47 against saddle base 34 to maintain and securely position the saddle guide 26 during flange forming operations.

Figure 5:
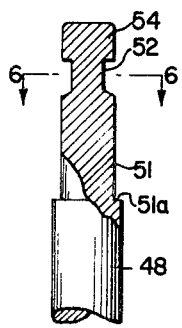
FIG. 5 is a vertical section through the upper end of the die pull-rod.
Figure 6:
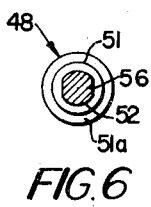
FIG. 6 is a section view taken along line 6—6 of FIG. 5.

The piston rod 48 of a conventional piston-cylinder type of fluid motor 49 serves as the die pull rod. Motor 48, as disclosed, is operated by air derived from a suitable motor-compressor and storage supply assembly through a bi-directional valve V controlled by solenoid 50 which is energized through foot pedal operated switch assembly 50a. Although a pneumatic power system is illustrated, in some installations it is preferable to use other equivalent power mechanisms such as hydraulic system or an electric power device. The upper end of pull rod 48 passes through the opening 42 in table 38, through the base passage 37, seat opening 36 and barrel opening 22 to a location inside of the conduit barrel. Shown in FIGS. 5 and 6, the upper end of rod 48 has a first, reduced diameter section 51 providing a bottom shoulder 51a, a second section 52 with a still smaller diameter and with flattened sides 56, and a third section 54 with a larger diameter equal to that of section 51.

The male die member 60 (details in FIG. 7) is one of the shapes which will be available and is fabricated from a circular steel disc 64 having a sloped lower edge 66 and a center opening 68 whose diameter is correlated to the diameter of rod section 51 to provide a close but free sliding fit. A hub 70 is suitably fastened to disc 64 by an annular weld 72, the bore through the hub having the same diameter as and being a continuation of the disc opening 68. A hollow cylinder 74 whose length is designated as $p$ is fastened by welding to the periphery of disc 64 and provides an annular cylindrical wall 76 with a diameter $d$ which, during the flange forming operation cooperates with the barrel material surrounding the barrel side opening 22 to shape the desired connecting cylindrical tap flange 27. Generally speaking, to make larger size male dies 60 when the diameter $d$ is increased, the length $p$ will also be increased. Smaller size dies can be made solid, somewhat like the die shown in FIGS. 17 and 18.

Figure 9:
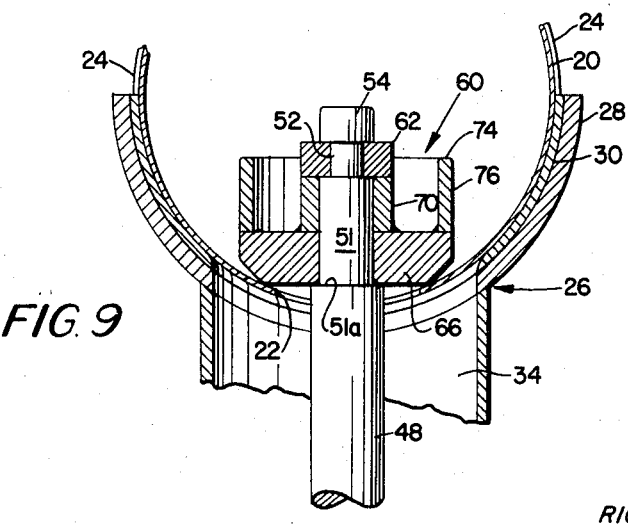
FIG. 9 is a vertical section view taken along line 9—9 of FIG. 8.

With reference to FIGS. 1 and 9, the male die member 60 is retained on the end of pull rod section 51 by a heavy U-shaped clamp 62, the legs of which are dimensioned to have a close but free sliding fit with the flat sides 56 of section 52 as the clamp is placed between the shoulders of sections 51 and 54. The clamp 62 can be forged or machined from steel plate.

Machine 25 is capable of manufacturing various sizes of tap fittings simply by providing a number of different sized saddle guide members 26 each of which will accept a specific diameter barrel component, and associated die members 60. For each size of barrel, a plurality of guides 26, each having a different size base passage 37 but the same size seat 28, are provided to enable an operator to selectively form a flange 27 of a desired tap diameter. Similarly, a plurality of male die members 60 each having a different diameter $d$, cooperate with the correspondingly sizes base passage 37 to form the various sizes of tap flanges 27.

The machine and method of the invention may also be used to manufacture lateral tap fittings as distinguished from the previously described T-fittings by using cooperating die and saddle members such as those shown in FIGS. 15 to 19 which are designed to form a 45° lateral tap flange in the barrel.

Figure 15:
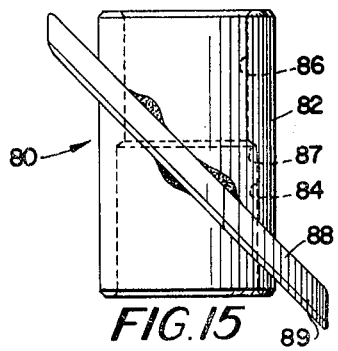
FIGS. 15 and 16 are side and top views respectively illustrating a male die for use in making a 45° lateral tap flange.
Figure 16:
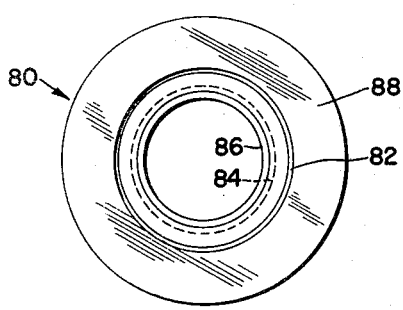

The male die member 80 illustrated in FIGS. 15 and 16 comprises a cylindrical hub 82, its bore having an enlarged diameter section 84 joining a smaller diametered section 86 at shoulder 87. A flange forming elliptical die disc 88 having a chamfered lower working edge 89 is rigidly secured as by welding to hub 82 at a 45° angle to the axis of the hub. The elliptical disc is so shaped that a vertical view shows the disc as circular. When the hub of die 80 is placed on rod 48, its bore section 86 provides a sliding fit on rod section 51, and its internal shoulder 87 abuts and rests on the rod shoulder 51a. The U-clamp 62 is slipped over the flats on rod 48 and slides over the top of hub 82 and retains the die on rod 48.

The chamfered working edge of the 45° disc engages the 45° inclined wall of a barrel placed in the inclined saddle and progressively stretches the material to provide a space stretched cylindrical terminal part and a faired zone at the flange transition into the barrel through flow path. The barrel placement for the lateral fitting flange formation will have its side opening offset, toward the lowermost end of the inclined barrel, from a centered condition with the male die in order that the terminal edge of the resultant flange will be roughly in a plane disposed normal to the axis of the top flange.

Figure 17:
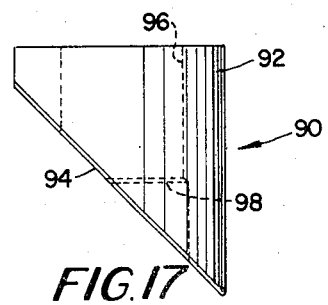
FIGS. 17 and 18 are side and bottom views respectively illustrating another male die for use in making small sized 45° lateral tap flanges.
Figure 18:
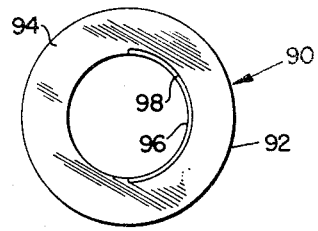
Figure 19:
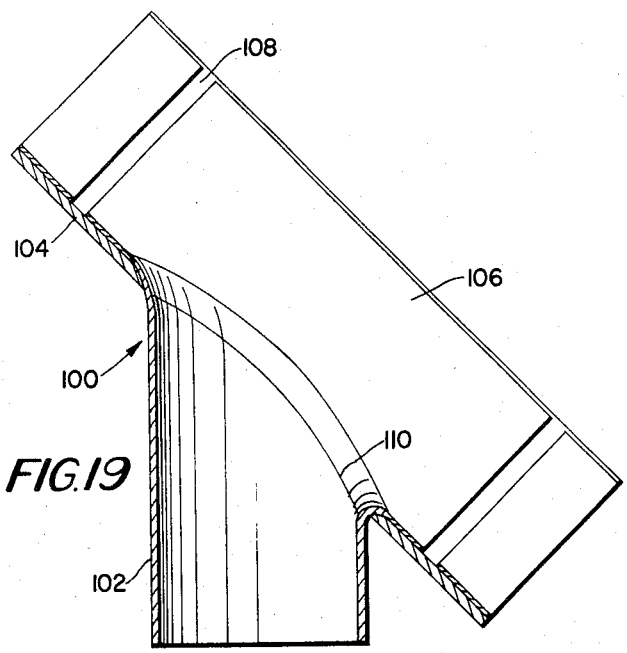
FIG. 19 is a vertical section through a modified saddle support member for use in making 45° lateral tap fittings.

The male die 90 illustrated in FIGS. 17 and 18 is preferably used when forming lateral fittings of small sizes and comprises a single piece cylinder hub 92 having a chamfered lower end 94 beveled at a 45° angle to the horizontal. The hub bore 96 fits over rod section 51 with the part-cylindrical shoulder 98 abutting against rod shoulder 51a, and the U-clamp 62 is then slipped into place on the end of the rod 48.

The lateral tap saddle 100 is similar to saddle 26 but is designed to cooperate with the lateral tap forming dies of FIGS. 15 to 18. The saddle includes a tubular base 102 and a seat 104 connected thereto at a 45° angle to the plane of the top surface of the table corresponding to either the mounting angle of disc 88 or beveled end 94. Like saddle 26, seat 104 has a three piece internal liner 106 providing barrel locating recesses 108, the seat also having a large faired opening 110 aligned with the bore of base 102.

An actual forming operation of a T-fitting will be described with reference to FIGS. 1-11, it being understood that the 45° lateral type of fitting may be similarly formed by using the die and saddle members of FIGS. 15-19. Initially, rod 48 is in its raised position without an assembled male die. The proper size of saddle guide 26 for the desired barrel size is selected and clamped in place on table 38. A preformed barrel 20 with one or more side wall openings pre-formed is placed on seat 28 with annular barrel ribs 24 disposed in the saddle recesses 32 which centers the barrel opening with base passage 37 and fitted over the raised pull rod 48. To assist in angularly centering the barrel opening 22 with base passage 37, the pre-formed barrel can be provided with wall alignment markings, relative to the side wall hole, which may be aligned, for example, with the top edge of saddle seat 28. When the barrel is in place, a selected die member 60 is installed through the end of the barrel on the end of rod 48 and the U-shaped clamp 62 slipped into place to secure the die 60 on the rod.

Figure 8:
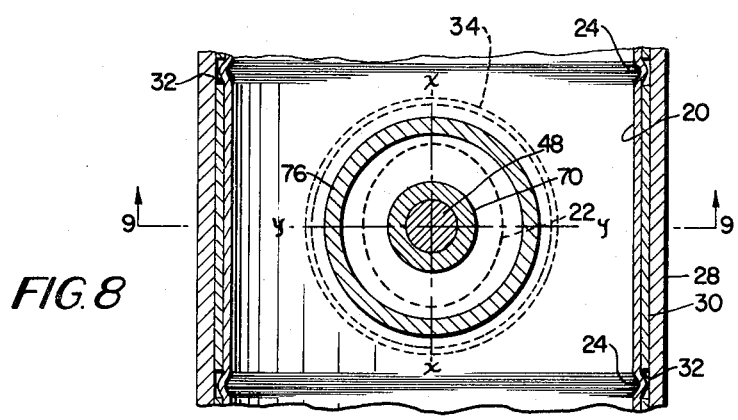
FIG. 8 is a horizontal section view taken along line 8—8 of FIG. 1, showing the relative diameters of the male die with respect to the pre-formed barrel opening.

As illustrated in FIGS. 8 and 9, the die member 60 is of greater diameter than any dimension across the elliptical hole 22 whose minor axis Y—Y lies in the transverse direction on barrel 20. Thus, the die 60 in its position of FIG. 1 and FIG. 8 first contacts the barrel wall at the lateral minor axis Y—Y (FIG. 8) because of the cylindrical form of the barrel. It is to be understood that a greater portion of the metal wall adjacent axis Y—Y will be stretched a greater amount than will the metal adjacent longitudinal axis X—X.

Figure 10:
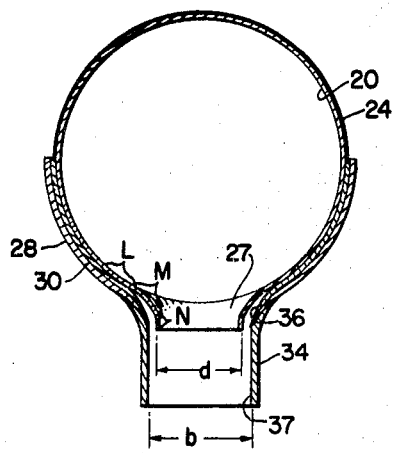
FIG. 10 is a vertical section taken along line 10—10 of FIG. 2, illustrating the resultant faired flange and its relationship to the saddle shaped barrel support member.

With the barrel in place and the die assembled on rod 48, depression of the foot pedal results in actuation of the valve V, causing operation of piston assembly 49 in a direction to pull the die 60 downwardly through opening 22. During the initial part of the down stroke, the die engages the metal adjacent minor axis Y—Y and pulls and stretches away from the barrel axis. As shown in FIG. 10, the metal is first guidingly stretched at section L where it engages and conforms to the contour of the faired saddle seal surface at the transition between saddle liner 30 with the base passage 37. The wall metal is then freely stretched in space through section or zone M as the die moves further down into base 34, and then is finally formed into a cylindrical section N of diameter $d$ by conforming to the diameter of the die as the die passes completely through the finished flange and into the bottom of base 34, the condition as shown in FIG. 2.

The diameter $d$ of die 60 is sufficiently smaller than diameter $b$ of base passage 37 of the corresponding guide member 26 so the formed terminal flange section N does not engage the wall of passage 37. The saddle guided, formed section of the finished flange 27 is section L. The faired flange zone M does not engage the inner surface of saddle guide 26 during the die pulling operation and is freely stretched in space and with section L provides a large faired surface which terminates in the cylindrical die conforming terminal flange section N.

The barrel metal located adjacent the major axis X-X is similarly stretched as shown in FIG. 9 although not to the same degree or amount as that adjacent the minor axis Y-Y.

When the die has been pulled completely through the flange and into bore 37 as shown in FIG. 2, the barrel 20 is freely resting on guide seat 28 and may be removed simply by lifting it from the saddle 26. The U-clamp 62 and the die 60 are now removed and the process repeated on another barrel. Note: When the foot pedal switch assembly 50a is released, the valve unit V will return to a normal position in which the pneumatic motor 49 operates to extend piston rod 48.

Since the finished flange 27 is cylindrical, and will have an approximately planar end edge normal to the center axis of the flange, a cylindrical branch conduit 120 having a planar circular end edge normal to its passage may be readily placed around the flange and attached thereto by welding which can be by hand or by automatic production methods, such as automatic welding, resulting in the fitting shown in FIGS. 13 and 14. This method, it will be appreciated, eliminates the necessity of accurately aligning and machining associated fitting parts and obviates the need for special connecting end saddles as has been required in the prior art fittings, and thus results in increased production and decreased costs, both for material and labor.

Figure 12:
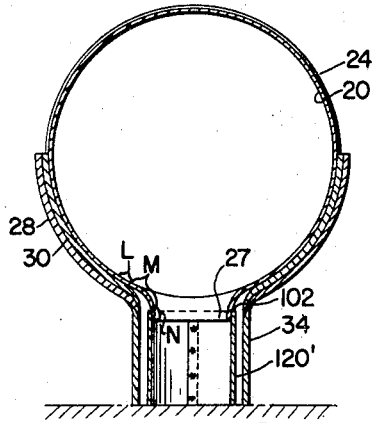
FIG. 12 is a vertical cross section of another embodiment of the invention in which the tap flange is formed according to the invention.

In the alternative embodiment illustrated in FIG. 12, the forming operation is essentially the same as that hereinbefore described. However, during the forming operation, a cylindrical branch conduit or tap 120' is concentrically positioned within the base passage 37 of the saddle guide beneath barrel opening 22 with its circular end fitted over an appropriate shoulder formed by the circular grooves 40 in table 38. The flange forming operation differs from the hereinbefore described method in that, as the cylindrical section N of the barrel flange 27 is formed, it is simultaneously projected into accurate contacting engagement and tight fit within the upper end of the pre-installed branch conduit 120'. When the male die reaches the bottom of its stroke it will have passed the terminal edge of the formed flange and will rest in spaced relationship within the short branch conduit 120', enabling the barrel and the tightly fitted branch conduit to be freely lifted from the machine saddle.

The foregoing described a method, as well as a machine for carrying out the method, for quickly, easily and economically manufacturing highly satisfactory and acceptable conduit tap fittings of the various sizes desired and standardized in the sheet metal conduit industry. The machine is simple in structure and operation and will make fittings which have barrel diameters from 4 inches up to at least 50 inches, by providing a plural number of saddle guide members 26 and die members 60. It has been found that, for a given size barrel 20, any size branch opening smaller than the main barrel size may be formed. Moreover, after the flange has been formed, the barrel is freely and easily removed from the machine since it is then merely resting in seat 28 and this is true whether the branch conduit is connected to the flange at a later time or is placed on the machine so that the flange is formed within the end of the branch conduit.

The method of the invention provides a large faired transition surface from the main barrel 20 to the cylindrical terminal zone of flange 27 which results in a more efficient, and hence advantageous, flow of fluid such as air from the main conduit to the branch than is found in most previously used fittings. This large fairing is accomplished in a much simpler manner than have been previously taught by first guidingly stretching the wall metal surrounding the barrel opening 22 and then freely stretching the transition metal in space.

Branch conduits for fittings no longer have to be made to fit the contour of the barrel, they merely have to fit over about five-eighth inches of the edge of the integral barrel flange. This permits standard branch pieces to be prefabricated from rectangular pieces of sheet metal because a specific diameter branch tap, e.g., one standard length of a 5 inch tap, can be used for T or lateral fittings on every diameter barrel. These simplified branch taps, being made from rectangular sheets, will eliminate waste which was always present when previously used taps were made with complex curvatures to form the contoured end to match the cylindrical wall of the barrel. The simplified tap made from rectangular sheet has its end edges forming a circle and lying in a plane. When this tap piece is assembled on the terminal portion of the barrel flange, the circular edge of the tap and adjacent zone of the flange lend themselves very readily to automated continual line welding of the tap edge joinder location to the adjacent flange zone. The machinery for such automated welding is not part of this invention but the method step is.

This invention also results in efficient and economical manufacture as distinguished from the time consuming, costly hand welding required of the contoured end edges of the previously known taps.

It is also pointed out that one saddle may be used for making several dimensions of branch fittings, e.g., a saddle for a 14 inch diameter barrel made to be used in forming a flange for an 8 inch diameter tap can also be used to form the flange for a 7 inch diameter tap. For larger barrels and the larger tap sizes a single saddle can be satisfactorily used in making flanges in a range of sizes greater than a 1 inch difference in diameter.

In smaller barrels the side wall openings, if the tap is aligned with the center line of the barrel, will be oval somewhat like a football profile, and as the barrels become larger the opening approaches a circular shape. It has even been found possible, by using a special saddle with a laterally offset base, to form a tap flange substantially tangential to the side wall of the barrel, in which case the opening which is precut in the barrel must be lop-sided oval. While the shape of such openings does not have to be precise, the resultant terminal edge zone of the flange should have a circular zone having a width of at least 1 inch to provide a complete annular engagement with the circular end of the tap piece to enable a good welded joinder between the tap and the flange. In all shapes of openings, the opening in the barrel must be smaller than the male die so that the die edge grabs the entire annular edge of the opening as the forming operation begins.

The terminal edge zone can have a cross section other than circular. For example, by suitably shaping the male die, the faired saddle seat transition and opening into the saddle guide base and the opening in the side wall of the barrel, a flange can be made with a flat oval or a square cross-section.

The invention may also be used to form more than one branch tap on a single barrel simply by providing one or more additional wall openings, such as opening 21 in FIG. 1, on barrel 20 and repeating the above described tap forming operation with the barrel rotated and relocated on the saddle or on a different saddle if a different sized tap flange is desired. In this manner a single barrel having a plurality of T and or lateral fittings can be quickly and easily manufactured at minimum cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for forming a thin walled metal conduit tap fitting comprising: base support means, table means mounted on said support means; workpiece support and guide means including a pedestal base having wall means defining a vertical passage therethrough, said base being disposed on said table means and the support and guide means being adapted to support a conduit fitting barrel provided with a wall opening and with said opening being aligned with said vertical passage; a vertically shiftable force exerting pulling means having an end extending upwardly through said table means and said pedestal base and adapted to extend through the conduit barrel opening into the conduit; and separable die means for mounting on said end of said pulling means; said pulling means including actuator means for pulling said die means downwardly through said conduit opening to form the conduit barrel material adjacent the barrel wall opening into a tap flange; said support and guide means with its pedestal base and said die means dimensionally related to provide an intermediate free space zone therebetween substantially wider than the thickness of the conduit barrel material so that the completely formed tap flange is made by stretching the metal adjacent the barrel wall opening substantially freely in space without confining opposite surfaces of the metal between said vertical passage wall means and said die means.

2. Apparatus as defined in claim 1, wherein said support and guide means comprises: a part-cylindrical seat connected to said pedestal base; said base passage is cylindrical and opens through said seat; the intersection of said pedestal base and said seat has a large faired surface providing a curved transition into the surface of said seat; and said die means is circular in plan form.

3. Apparatus as defined in claim 2, wherein the lower working edge of said die means is chamfered.

4. Apparatus as defined in claim 3, wherein said axis of said seat cylindrical surface extends parallel to the upper surface of said table means and said die means has a cylindrical plug form.

5. Apparatus as defined in claim 3, wherein the axis of said seat cylindrical surface extends at an approximately 45° angle to the plane of the top surface of said table means and at least the lower working surface of said die means is inclined at an approximately 45° angle to the vertical axis of said die means.

6. Apparatus as defined in claim 1, wherein said table means and said force exerting pulling means, are universal means enabling use of any one of a plurality of support and guide means of various sizes for making fittings with different conduit barrel and tap dimensions together with use of any of a plurality of die means matched to an associated selected one of said support and guide means.

7. Apparatus as defined in claim 6, wherein said table means comprises means engaging, positioning and maintaining any selected support and guide means of said plurality of guide means on said table means.

8. Apparatus as defined in claim 7, wherein said pedestal base is circular sheet metal and said engaging, positioning and maintaining means includes a plurality of upstanding concentric guide lands on the top of said table means to receive the lower end of said pedestal base of a selected support and guide means.

9. Apparatus as defined in claim 7, wherein said engaging, positioning and maintaining means includes guide tracks in said table means and releasable clamping means adjustably disposed in said guide tracks adapted to engage and clamp the pedestal base of said support and guide means to said table means.

* * * * *

UNITED STATES PATENT OFFICE
CERTIFICATE OF CORRECTION

Patent No. 3,680,349　　　　　　　　　Dated　August 1, 1972

Inventor(s)　Richard W. Horton

It is certified that error appears in the above-identified patent and that said Letters Patent are hereby corrected as shown below:

Column 5, line 42, change "sizes" to --sized--.

Column 6, line 8, change "top" to --tap--.

Column 7, line 2, change "seal" to --seat--.

Column 8, line 3, change "described" to --describes--.

Column 9, line 12, change "1 inch" to --1/4 inch--.

Signed and sealed this 3rd day of April 1973.

(SEAL)
Attest:

EDWARD M. FLETCHER, JR.　　　　　　ROBERT GOTTSCHALK
Attesting Officer　　　　　　　　　　Commissioner of Patents